United States Patent
Beard (10) Patent No.: US 7,245,725 B1
(45) Date of Patent: Jul. 17, 2007

(54) DUAL PROCESSOR FRAMER

(75) Inventor: Paul Beard, Milpitas, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 931 days.

(21) Appl. No.: 10/147,765

(22) Filed: May 17, 2002

Related U.S. Application Data (60) Provisional application No. 60/291,720, filed on May 17, 2001.

(51) Int. Cl.
 H04K 1/00 (2006.01)
 H04L 27/00 (2006.01)
 H04B 1/00 (2006.01)
 G06F 1/00 (2006.01)
 H04L 9/00 (2006.01)
 H04B 7/00 (2006.01)

(52) U.S. Cl. ............... 380/270; 380/261; 713/300; 455/68; 375/295

(58) Field of Classification Search ............... 375/295; 380/261, 270; 713/323, 300; 455/68
See application file for complete search history.

(56) References Cited

U.S. PATENT DOCUMENTS

| | | | |
|---|---|---|---|
| 4,980,836 A * | 12/1990 | Carter et al. | 713/322 |
| 5,115,451 A | 5/1992 | Furlong | 375/7 |
| 5,123,029 A | 6/1992 | Bantz et al. | 375/1 |
| 5,442,659 A | 8/1995 | Bauchot et al. | 375/202 |
| 5,471,503 A | 11/1995 | Altmaier et al. | 375/202 |
| 5,515,439 A | 5/1996 | Bantz et al. | 380/23 |
| 5,548,616 A * | 8/1996 | Mucke et al. | 375/295 |
| 5,566,201 A * | 10/1996 | Ostman | 375/130 |
| 5,631,592 A * | 5/1997 | Schwarz et al. | 327/172 |
| 5,657,326 A | 8/1997 | Burns et al. | 370/349 |
| 5,699,383 A * | 12/1997 | Ichiyoshi | 375/297 |
| 5,722,046 A * | 2/1998 | Serfaty et al. | 340/7.35 |
| 5,825,811 A | 10/1998 | Souissi | 375/202 |
| 5,838,730 A * | 11/1998 | Cripps | 375/272 |
| 5,982,807 A * | 11/1999 | Snell | 375/146 |
| 5,987,033 A | 11/1999 | Boer et al. | 370/445 |
| 5,999,824 A * | 12/1999 | Na | 455/553.1 |
| 6,009,313 A | 12/1999 | Ichiyoshi | 455/76 |
| 6,163,845 A * | 12/2000 | Zhao et al. | 713/300 |
| 6,169,759 B1 * | 1/2001 | Kanterakis et al. | 375/130 |
| 6,240,521 B1 * | 5/2001 | Barber et al. | 713/323 |
| 6,271,722 B1 * | 8/2001 | Ballantyne | 330/51 |

(Continued)

OTHER PUBLICATIONS

Ajjikuttira, Aruna et al. "A Fully-Integrated CMOS RFIC Bluetooth Applications", ISSCC 2001, §13.2, 2001 IEEE.*

(Continued)

Primary Examiner—Kambiz Zand
Assistant Examiner—Michael J. Simitoski
(74) Attorney, Agent, or Firm—Marger Johnson & McCollom, P.C.

(57) ABSTRACT

A dual processor framer includes a receiver and a transmitter which share common circuitry and/or code. Separate direct memory access controllers may be used for each of the receiver and transmitter. Processing is distributed over two or more processors. One processor may be a lower power processor while another processor may be a higher power processor. At least one of the two or more processors may be programmable or reconfigurable. The transceiver is configured to provide internal loop back self testing at various points in the processing. Timing within the transceiver may be established almost entirely by a single clock domain.

17 Claims, 8 Drawing Sheets

U.S. PATENT DOCUMENTS

| | | | |
|---|---|---|---|
| 6,311,287 B1* | 10/2001 | Dischler et al. | 713/601 |
| 6,353,627 B1 | 3/2002 | Schilling | 375/130 |
| 6,366,622 B1* | 4/2002 | Brown et al. | 375/322 |
| 6,445,937 B1* | 9/2002 | daSilva | 455/574 |
| 6,463,306 B1* | 10/2002 | Jacobs | 455/574 |
| 6,501,999 B1* | 12/2002 | Cai | 700/82 |
| 6,510,396 B1* | 1/2003 | Colosky | 702/85 |
| 6,574,739 B1* | 6/2003 | Kung et al. | 713/322 |
| 6,577,297 B1* | 6/2003 | Wright | 345/161 |
| 6,580,905 B1* | 6/2003 | Naidu et al. | 455/522 |
| 6,590,885 B1* | 7/2003 | Jorgensen | 370/338 |
| 6,738,601 B1* | 5/2004 | Rofougaran et al. | 455/66.1 |
| 6,761,316 B2* | 7/2004 | Bridgelall et al. | 235/462.46 |
| 6,765,911 B1* | 7/2004 | Branstad et al. | 370/395.1 |
| 6,775,788 B1* | 8/2004 | McCarthy et al. | 713/400 |
| 6,907,048 B1* | 6/2005 | Treadaway et al. | 370/474 |
| 2001/0003206 A1* | 6/2001 | Pole et al. | 713/320 |
| 2001/0015999 A1* | 8/2001 | Nam | 375/148 |
| 2001/0055281 A1* | 12/2001 | Kwan | 370/280 |
| 2002/0031166 A1* | 3/2002 | Subramanian et al. | 375/130 |
| 2002/0034934 A1* | 3/2002 | Watanabe et al. | 455/318 |
| 2002/0034964 A1* | 3/2002 | Bannai et al. | 455/556 |
| 2002/0061060 A1* | 5/2002 | Lukac-Kuruc et al. | 375/220 |
| 2002/0137460 A1* | 9/2002 | Sun et al. | 455/41 |

OTHER PUBLICATIONS

Ball, Stuart and Michael Barr. "Introduction to Counter/Timer Hardware" Embedded Systems Programming, Sep. 2002, pp. 55-56.*

Bluetooth SIG. "Specification of the Bluetooth System, Version 1.1", Feb. 2001.*

Bryan, Skip. "Bluetooth Wireless Connectivity-What, How and When!", Jun. 2000.*

Darabi, H. et al. "A 2.4 GHz CMOS Transceiver for Bluetooth", ISSCC 2001, §13.3, 2001 IEEE.*

Djadoudi, Mohamed. "What is Bluetooth?", Mar. 2001.*

Filiol, Norm et al. "A 22mW Bluetooth RF Transceiver with Direct RF Modulation and On-chip IF Filtering", ISSCC 2001, §13.4, 2001 IEEE.*

FOLDOC. "Free On-Line Dictionary Of Computing", <http://foldoc.doc.ic.ac.uk/foldoc/index.html>.*

Galli, S. "Bluetooth Technology: Link Performance and Networking Issues", European Wireless Conference, Sep. 2000.*

Garcia, Justin et al. "PDA/Cell Phone Data Linkage via Bluetooth", Fall 2001.*

Haartsen, Jaap C. "Bluetooth—A New Low-Power Radio Interface Providing Short-Range Connectivity", Oct. 2000 IEEE.*

Kardach, James. "Bluetooth Architecture Overview", 2000.*

Keese, William O. et al. "A 2.4 GHz radio solution for Bluetooth adn wireless home networking", 2000 International IC—Taipei Conference Proceedings.*

Komoto, Eiji et al. "Development of Bluetooth System LSI", Dec. 2000.*

Lindholm, Tancred. "Setting up a Bluetooth Packet Transport Link."*

Melpignano, Diego et al. "Analysis of File Transfer Protocol Over Bluetooth Radio Link", Sep. 2000.*

Microsoft Press. "Computer Dictionary, Third Edition", 1997 Microsoft Press, p. 262.*

Miller, Brent A. et al. "Bluetooth Revealed" 2ed., 2000.*

Rohde & Schwarz. "Generating Bluetooth RF Test Signals With SMIQ Signal Generator", Jan. 2001.*

Zolfghari, Alireza et al. "A 2.4 GHz 34mW CMOS Transceiver for Frequency-Hopping and Direct-Sequence Applications", ISSCC 2001, §26.6, 2001 IEEE.*

Bluetooth. "Specification of the Bluetooth System", Version 1.1, Feb. 2001, pp. 1-4, 21-22, 95, 112, 124, 211-216, 218-220, 222-223, 422 & 796.*

The IEEE 802.11 Handbook: A Designer's Companion; Authored by Bob O'Hara and Al Petrick; Published by Standards Information Network, IEEE Press, The Institute of Electrical and Electronics Engineers, Inc.

* cited by examiner

DUAL PROCESSOR FRAMER

CROSS REFERENCE TO RELATED APPLICATIONS

This application claims the benefit of U.S. Provisional Application No. 60/291,720, filed May 17, 2001, which is hereby incorporated by reference.

FIELD OF THE INVENTION

The present invention generally relates to the field of wireless data communications, and, particularly, to wireless communication devices which are managed using two or more processors.

BACKGROUND OF THE INVENTION

Wireless local area networks (WLANs) permit great mobility of various communication devices in a local environment. Radio frequency signals used in WLAN devices penetrate floors and walls. A user with a wireless device may travel throughout a building, up, down, or laterally, and still remain connected to the WLAN. This frees the user to conduct parallel activities while staying in contact with the WLAN. For instance, the user may retrieve a document or other item while remaining in communication with co-workers on different floors.

There is a great variety of wireless communication devices for connecting to a WLAN. Different wireless devices contain different features and capabilities. They are further limited to a particular wireless standard, such as the BLUETOOTH wireless standard, IEEE 802.11, and Home RF, and even to a particular version of the wireless standard. A number of these wireless communications devices are managed by multiple processors.

Even with the great variety of wireless devices available, there are still areas where the capabilities of these devices are less than ideal.

First, power conservation management has not been adequate in current devices. Portable wireless devices contain batteries which need to be recharged periodically. Increasingly diverse tasks performed by processors within the portable wireless devices consume varying amounts of power. Current wireless devices do not efficiently allocate energy resources so as to maximize the time before the batteries have to be recharged.

Second, configurability of processing is limited in current wireless devices. For instance, wireless devices may utilize two (or more) processors with a framer. These processors may be disposed together with the framer in the same housing or separately from the framer. A drawback to these current wireless devices is that the processors have unchangeable configurations. This prevents switching between different wireless standards, upgrading to a newer version of the wireless standard, and modifying the processor configuration to correct for errors or otherwise improve performance, such as by better balancing signal paths.

Third, current wireless devices lack adequate self-testing. Current testing of wireless devices is cumbersome because a second wireless device is required to perform device testing. A second wireless device for testing may not be available when needed. Wireless devices need to be checked for operational characteristics not only during manufacture, but also in the field. This need becomes greater for those devices that travel from a warmer environment to a cooler one or from a dry environment to a more humid one. For instance, the user may enter a refrigerated room or a clean room or may venture from inside a builder to outside a building and find that the wireless device he or she is carrying does not function as well because of device environmental sensitivity.

Fourth, synchronization between the different component parts of a wireless device has been limited. Superior device performance occurs when the components of the device are well synchronized. Although current wireless devices do synchronize component operations to a limited extent, the level of synchronization is not adequate for increasingly higher processing within the wireless device.

Fifth, certain wireless device applications require heightened reliability for work in severe, hazardous, or isolated environments. Current wireless communications devices, even those managed by multiple processors, are not built with the redundancy for extremely reliable wireless communications. Extreme working environments demand highly reliable devices. For example, a user may need to carry a wireless communications device into a work space having a caustic atmosphere such as a chemical processing plant or around the cooling system of a nuclear reactor. In such circumstances, it may be imperative to have an extremely reliable communications device to ensure contemporaneous and immediate analysis of imminent dangers.

Consequently, there is a need for dual processor framers in which at least one of the processors is programmable to allow for reconfiguration, those in which the wireless device provides adequate self-testing, those in which internal synchronization of the framer is tightly controlled, and/or those which require a very high degree of reliable operation. Therefore, it would be desirable to provide a solution that addresses deficiencies in the conventional devices.

SUMMARY OF THE INVENTION

Accordingly, the present invention is directed to a method and apparatus for a dual processor framer in which two or more processors distribute the processing workload in which at least one processor is reconfigurable, in which multiple self-testing modes are available, and in which the amount of circuitry timed by a single clock domain is maximized. The present invention is especially useful in portable wireless devices.

Power is conserved in portable wireless devices by switching off higher power processors and allocating tasks to lower power processors to preserve portable wireless device battery life. Multiple power conservation modes may be used which are selectable. A low power processor may be used for certain operations on a routine basis and a high power processor may be used on a less frequent basis so as to reduce device power consumption.

Configurability of the wireless device is achieved by manufacturing the device as reconfigurable or reprogrammable. This may be accomplished through a field programmable gate array. A wireless device may be reconfigured to switch to another wireless standard of operation, may be reconfigured for an upgraded version of a wireless standard, or may bypass failed or questionable areas of an integrated circuit chip or rerouting signal paths to better balance the signal processing.

Self testing is enhanced by allowing the wireless device to self test on multiple levels. The signal from the transmitter section may be directly routed back to the receiver section of the wireless device to determine the adequacy of device operation. Furthermore, the data processed at several points in the transmitter section may be routed to corresponding points in the receiver section to make intermediate determinations of device performance. Full duplex loop back internal self testing enhances operational reliability as it permits a user to test device operation as desired without the need for an outside testing device.

Synchronization is improved by using a single clock domain for the entire framer except for a final transmitter stage. Synchronization is further improved if one of the processors also is controlled by the same single clock domain. Because of the common clock, it is easier to fine tune the performance of the wireless device. The use of common clocking as well as other components common to both the transmitter and receiver sections, such as common memory and a common interface, allows for a more compact device.

The use of two processors as back ups to each other provide for redundant operation. This increases device reliability. This is especially useful in extreme or isolated environments where maintaining communications is of critical importance.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 9, exemplary embodiments of the present invention are shown.

The present invention relates to a dual processor framer. The dual processor framer handles all bit-wise operations of transmitted and received data, and identifies time slots assigned to a channel or subchannel for transmission using time division multiplexing under the control of multiple processors. The dual processor framer supports synchronous serial communications wherein units of transmission, which may be measured in elapsed time such as beginning with a start bit that precedes a character and ends with a last stop bit that follows a character, and synchronous communications are provided, in which a package of information transmitted as a single unit, such as having every frame following similar basic organization and containing control information, such as synchronizing characters, station address, error-checking values, variable amounts of data, and the like, as contemplated by a person of ordinary skill in the art. For example, a dual processor framer may be provided in which the first processor provides asynchronous communication and the second processor provides synchronous communication. The dual processor framer is suitable for providing simultaneous communication between multiple channels, such as multiple channel communication transmittal, multiple channel receipt, simultaneous receipt and transmittal, and the like, as contemplated by a person of ordinary skill in the art without departing from the spirit and scope of the invention. For example, one processor may operate on a channel different from the second processor, may alternate hops performed between processors, frame data from two different sources, transmit utilizing a first processor and receive utilizing a second processor, and the like. The dual processor framer may be implemented in hardware and/or software. Communications between processors may be interrupt driven or may be accomplished through polling. In the case of an interrupt mode of operation, an internal and/or external line may be dedicated for sending an interrupt signal for a variety of conditions.

As stated above, the present invention concerns two processors which interface with a framer. The framer of the present invention may be depicted in broad terms as having a transmitter section, a receiver section, common clocking, common memory, and a common interface, in which processing is distributed over two or more processors. The processors may be located in various arrangements with respect to the framer. At least one of the processors may be reconfigurable so as to permit device upgrades and remedial measures. The processors may be redundant so as to enhance device reliability. The dual processor framer may have a single clock domain in almost the entirety of the framer and at least one processor so as to optimize performance through finely controlled timing operations. The dual processor framer may allow extensive self testing so as to adapt to changing environmental conditions.

Figure 1:
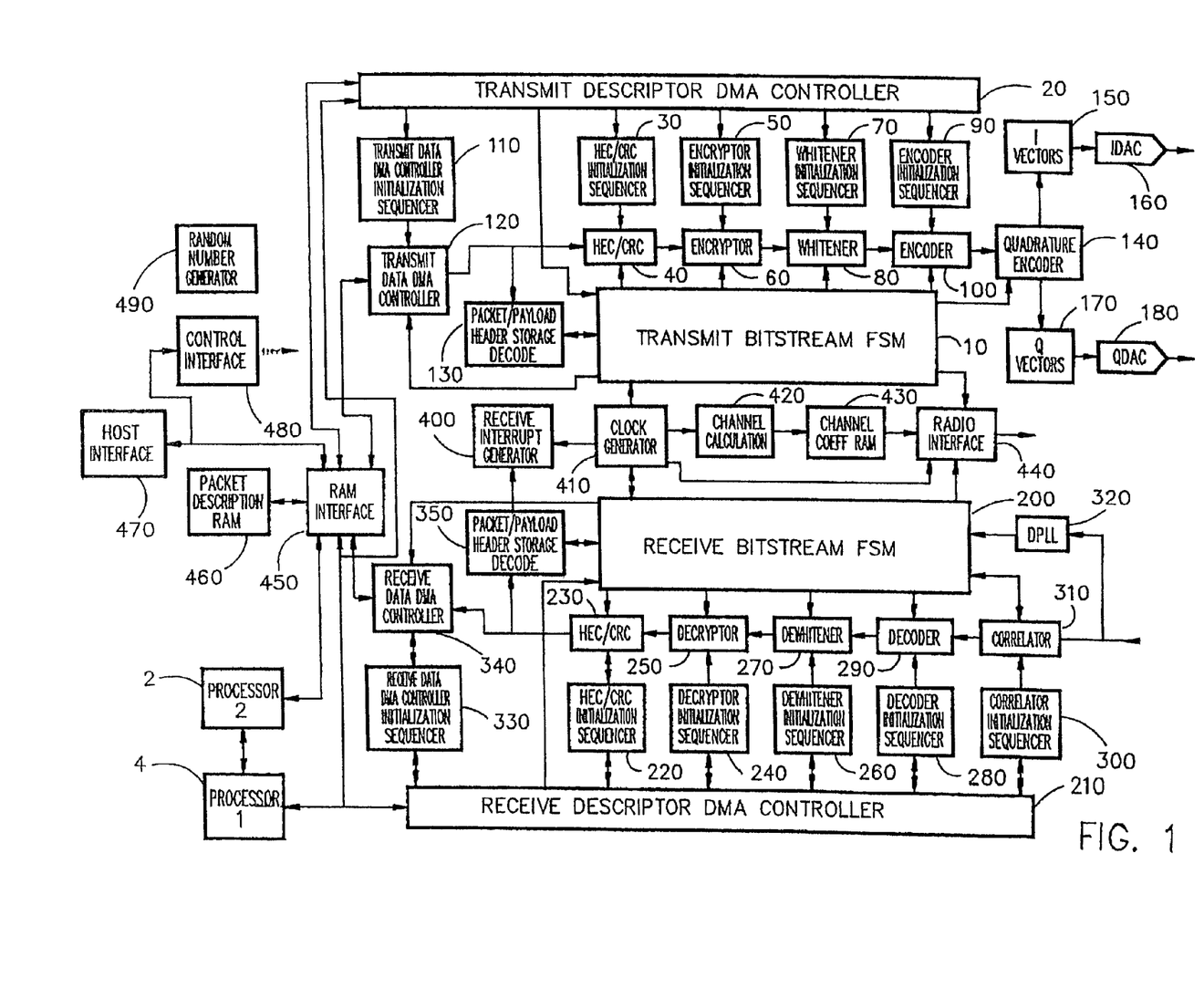
FIG. 1 shows a functional block diagram of a transceiver of the present invention.

FIG. 1 shows a block diagram of the components of the framer and two processors 2 and 4. The processors may communicate with one another over a bus. They may be managed through an arbitration algorithm implemented in hardware, software, or firmware. The two processors may have a master-slave relationship or may negotiate the administration of tasks. As shown in FIG. 1, each of the receive and transmit sections may include a direct memory access controller and a finite state machine. The transmit section includes the transmit bitstream finite state machine 10 and the transmit direct memory access (DMA) controller 20 as well as various necessary functions for transforming the data. The receive section includes the receive bitstream finite state machine 200 and the receive DMA controller 210. Functions performed by the dual processor framer include packetizing, encoding/decoding, whitening/dewhitening, encrypting/decrypting, error correction, hop sequencing, and correlation. A packet may be transmitted over multiple frame slots.

The two processors may be implemented in a variety of configurations. One specific embodiment is shown in FIG. 1 in which processor 4 directly manages DMA controllers 20 and 210 and also communicates to the framer through memory interface 450 while processor 2 communicates to the framer only through processor 4 and memory interface 450. Many other arrangements are possible and are within the scope and spirit of this invention.

Figure 1A:
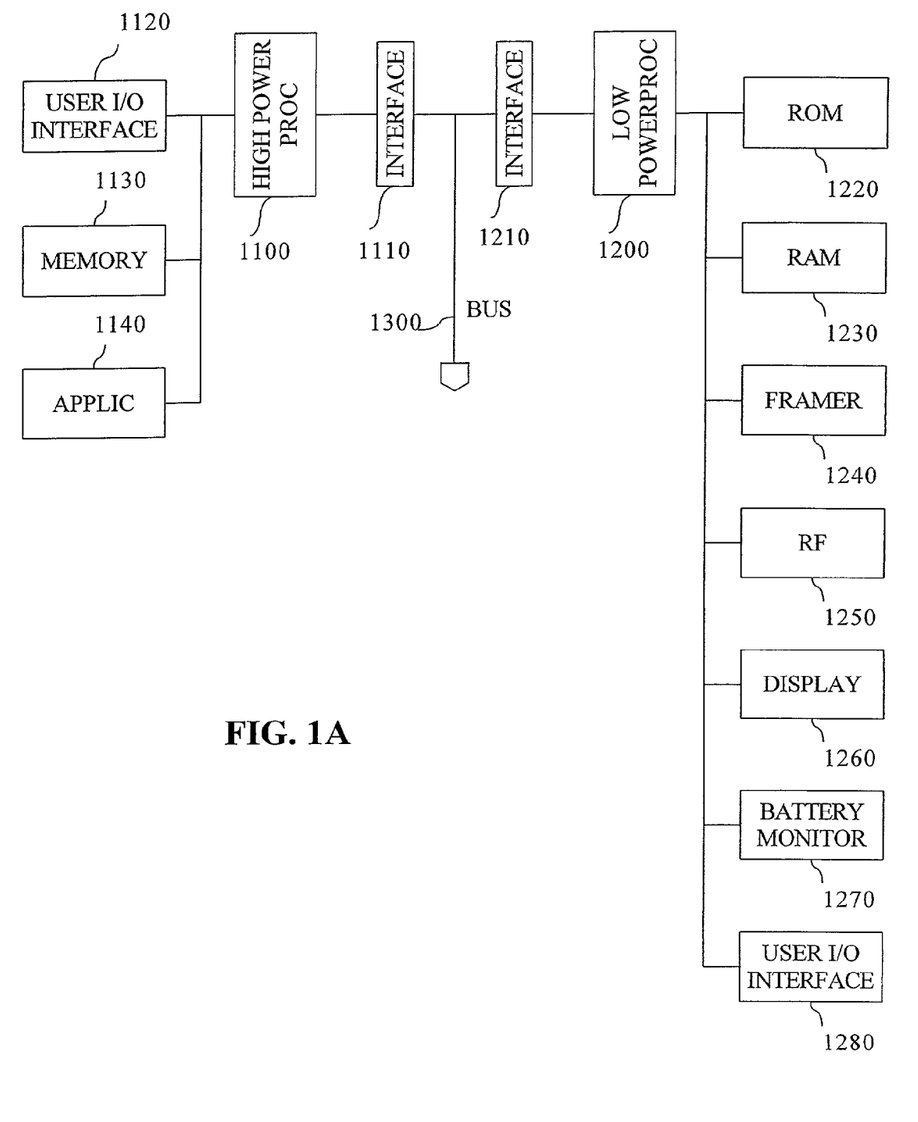
FIG. 1A shows an alternative functional block diagram of a dual processor with the framer.

FIG. 1A illustrates an embodiment in which two processors 1100 and 1200 manage the workload of a wireless communications device. A low power processor 1200 may be coupled to a RAM 1230, ROM 1220, the framer 1240, RF processing circuitry 1250, a display 1260, a battery monitor 1270, and a user I/O interface 1280. The high power processor 1100 may run applications 1140 and may be coupled to memory 1130 and a user I/O interface. The high power processor may consume two, three, four, or more times the power the low power processor uses. The two processors may handle different sized data words; for example, the high power processor 1100 may handle 32 or 64 bit words, while the low power processor 1200 handles 8 or 16 bit words. Communications between the processors 1100 and 1200 may occur through interfaces 1110 and 1210 over a bus 1300. Other arrangements are possible and are within the scope and spirit of the present invention. For instance, the high power processor 1100 may be more directly coupled to the framer and may communicate directly with the framer 1240. Other functions may be changed, deleted, or added to the processors. The functions performed by the two processors may be arranged differently than that shown in FIG. 1A.

In the framer, as shown in FIG. 1, each of the initialization sequencers 110, 30, 50, 70, 90, 330, 220, 240, 260, 280, 300 set an initialization state for their respective processes. Initialization may be performed through the hardware and/or software processing of several instructions of computer code. Hardware may be used to implement a circuit which responds to an initialization signal. This signal may be a power up signal, a power down signal, a monitor signal, or the like. The sequencers may be activated on power up or on entering power saving mode. Control registers may be programmed by the initialization sequencers for masking operations, power down modes, or monitor modes.

The transmit data DMA controller 120 retrieves data to be transmitted from the RAM interface 450. This data is passed along for further processing, starting with header error correction and cyclic redundancy check processing 40 and the packet/payload header storage/decode 130.

A packet of data has a header error correction (HEC) and cyclic redundancy check (CRC) assigned to certain fields. The HEC and CRC may be calculated through either hardware or software. For the sake of flexibility, software code may be implemented in the form of subroutines or standalone code. For the sake of speed, the processing may be implemented in hardware or a combination of hardware and software. A HEC/CRC initialization sequencer 30 is in charge of setting default start values for the HEC/CRC. These may be changed through user input or may be set dynamically through an internal algorithm. Another process 40 stores, modifies, and assigns to the appropriate fields of the packet the HEC and CRC.

Various schemes may be employed to ensure that the data, if intercepted, is not read and understood by someone other than the intended recipient. Wireless Encryption Privacy or another privacy standard may be used. An initialization sequencer for encryption 50 sets a default encryption state of the packet. The data of a new packet is encrypted 60.

The data may be whitened by a whitening process 80 to remove any direct current voltage offset. An initialization sequencer 70 sets an initialization state for the whitener. Whitening is performed on both the payload and the header to randomize the data when it is highly redundant. Whitening is accomplished through a polynomial operation. The polynomial generated is exclusive ored with the header and the payload. Then the result bit pattern is input to a linear shift register to generate the whitening word. Data whitening is also known as scrambling.

The whitened data word is encoded using forward error correction (FEC) or automatic repeat request (ARQ). Data corruption has various causes including burst errors. FEC encoding helps to prevent data corruption. The packet header is encoded using ⅓ rate FEC in which the bit is repeated three times. A shortened Hamming code or ⅔ rate FEC encodes various packet types. ARQ encodes a payload that has CRC.

Further processing is done by the quadrature encoder 140 to generate in-phase I vectors 150 and quadrature Q vectors 170. The data signals of these vectors are converted to an analog form of the I vectors 160 and an analog form of the Q vectors 180.

Similar processes, but in reverse, are found in the receive section. The receive section includes a receive bitstream finite state machine 200 and receive descriptor DMA controller 210.

The received data processing of the framer begins with stripping out bits to form a sampling clock and processing the remainder of the bits of the received data by a correlator.

Digital phase locked loop (DPLL) 320 uses digital samples extracted from the received data signal and the framer clock to generate a clock which samples the received data to determine the value of that data, i.e., reconstruct the bit patterns of the original payload data.

Correlator 310 performs a recovery operation because the signal analyzed by the receiver section may be corrupted through interference with other signals that it was contemporaneous with during transmission through the air or other dispersive medium or by filtering at either or both of the receiver section and/or the transmitter section. The receiver section produces a series of complex vector values which are the weighted sums of several other complex symbol values which are temporally proximate in time of transmission, time of reception, and/or time of processing. Channel coefficients are the weighting factors which describe the intersymbol interference and are determined by correlating the received signal known symbols included in the transmission, such as generated through the channel calculation process 420 using a channel coefficient RAM 430. Correlator 310 provides a correlated signal for decoding.

Whereas the transmit header undergoes HEC generation, whitening, and FEC encoding, the receive header undergoes decoding 290, dewhitening 270, and HEC checking 230. Whereas the transmit payload undergoes CRC generation, encryption, whitening, and encoding, the receive payload undergoes correlating 310, decoding 290, dewhitening 270, decryption 250, and CRC checking 230. The packet/payload header is stored and decoded 350. A receive interrupt generator 400 informs the host that data has been received and translated and is ready for transfer. The receive data DMA controller 340 manages transfer of the translated, received data to the host.

Certain processes are common to both the receive and transmit sections. The common functional components include a random number generator 490, a common memory 460 and memory interface 450, a single clock domain for almost all the transceiver functions, radio interface 440, control interface 480, and host interface 470.

The random number generator 490 may be used to generate the sequence information for frequency hopping in the transmitter and receiver. The random number generator 490 may be a pseudo random number generator as described in a related application, U.S. patent application Ser. No. 10/147,282, filed May 17, 2002, which is hereby incorporated by reference.

A common random access memory (RAM) interface 450 provides packet/descriptor data from RAM 460. The packet/descriptor RAM 460 may serve as the data interface between the host and the framer. Both the framer and the host are able to access memory 460 through the memory interface 450. Packet/descriptor memory 460 need not be RAM memory, but may be any memory that can fulfill the functional tasks required of it. This could be nonvolatile memory as well as volatile memory.

In the present invention, a single clock domain may be employed to provide the clocking for most of the transmitter processing (except that the last stage of the transmitter processing may be reclocked by the radio so it can tolerate jitter on the main clock domain) and all of the receiver processing. This single clock domain may time the slot synchronizer, the radio interface, and a processor integrated with the framer onto a common chip or circuit board. The base clock of the common clock generator 410 may be derived from a dedicated voltage controlled oscillator or crystal. If the dual processor framer is implemented as an integrated circuit, the voltage controlled oscillator, crystal, or other timing source may be placed externally and proximate to the integrated circuit. In a particular embodiment, the base clock frequency is between 10 and 20 MHz; more particularly, approximately 13 MHz (with a ±15 parts per million crystal temperature stability).

Radio interface 440 provides control signals to the analog transmitter and receiver components. These control signals control bias, power, and frequency parameters of the transmitter and receiver. The radio interface 440 also transmits status information to the framer.

Control interface 480 provides for user input. The control interface 480 may be implemented in numerous ways. The control interface may be a touchscreen on a portable device. It may include an LCD screen and a stylus or keypad. The LCD screen itself may displayed as a keyboard arrangement for data entry. The control interface may be a keypad with a speaker and microphone to allow audio communications with others on the WLAN. The control interface may even be a pure audio input device. The audio input may be interpreted through voice recognition processing. The control interface may also provide notice of battery power availability and estimated time before recharge or replacement of the battery.

The host interface 470 is coupled to the control interface 480 and the RAM interface 450. The host interface 470 may provide address decoding, indirect addressing, processor control, framer control, and interrupt control. Communications between the host and the dual processor framer of the present invention may be performed through cabling or a wireless interface such as radio frequency or infrared. A host is a computing device, handheld communications device such as a personal data assistant, an access point, or other wireless device. The host may communicate with other hosts and their connected devices.

The transceiver may use a time-division duplex scheme. In a usual mode of operation, the transmit section alternates with the receive section to send data and receive data in time slots of a given duration. A time slot occupies a unit of time of 625 microseconds. In an embodiment, a deviation of 1 microsecond is permitted in the time slot length. In alternative embodiments, a frequency division mode or other scheme may be used.

The receive and transmit FSMs and the DMA controllers, as well as the other components of FIG. 1, may be implemented as digital circuits on a single integrated circuit or on a single printed circuit board. The transmit FSM and transmit DMA controller may be implemented on one single integrated circuit and the receive FSM and receive DMA controller may be implemented on another single integrated circuit. There may be a single DMA controller for both the receive FSM and the transmit FSM. The DMA controllers and FSMs may be implemented through software. Other arrangements of the circuitry and/or code are within the scope and spirit of the present invention.

FIGS. 2–5 illustrate possible arrangements of two processors which handle the work load of the transceiver. At least one of the processors may be reconfigurable so as to permit a wireless communications device that may be changed to operate with different wireless communications standard, that may be upgraded to work with a later version of a given wireless standard, or that may be reconfigured to correct for errors or optimize performance by rerouting signals in the processor. The reconfigurable processor may be implemented through a programmable logic array, a field programmable gate array, or the like. In certain applications, the processors may lack configurability to avoid inadvertent modification to the processor functions. Even in these certain applications, redundancy, internal self testing, and a high level of internal synchronization may still be desirable. The interconnection of the processors and framer may be achieved in a variety of ways, including through intervening components and circuitry, and is not meant to be limited by what is shown in FIGS. 2–5. For instance, the processors may be directly connected together, may be interconnected through intervening elements, or may not be interconnected.

Power conservation may be achieved through the use of two processors. The dual processor framer may include a first processor suitable for operation at a first power level and a second processor suitable for operation at a second power level, the first power level may be a power saving level, such as utilizing less power than the second power level. For example, the framer may be utilized to provide multiple transmission based on power requirements, both of the power requirements of the device utilizing the framer, such as in a power savings mode, and the requirements of transmittal, such as the utilization of increased power to increase range of the transmitter. There may be three or more different power modes which are selectable. One of the power modes may be a lower power mode with a slower clock frequency. A low power processor may be used for certain operations on a routine basis and a high power processor may be used on a less frequent basis so as to reduce device power consumption.

By using two or more processors, the processing work load may be distributed to provide for more efficient operation. By distributing processing, one processor may be decoupled from the rigors of protocol. One processor may handle events small and finite in time while the other processor handles long term events as sleep mode and power saving mode, which may be enacted through a timing mechanism triggered by a lack of certain activity. One processor may perform applications level processing while another processor may perform other levels of processing. In an embodiment, one processor may implement link control functions such as managing low-level packet traffic and transferring data between a host and the framer and processor. One processor housed in a wireless communications device may store a minimal amount of bootable code which calls up an off device processor to complete the booting process. In an embodiment, one processor may digitally set one of a plurality of power levels to a power amplifier for transmitting the signal, e.g., the power levels may number 5, 7, 8, or a different number. The present invention allows one processor to be dedicated to real time processing operations. In one embodiment, a processor within the transceiver housing performs thin client type operations and an external processor performs more extensive processing.

Some or all functions may even be shared by the processors. This may be accomplished by handshaking, interrupts, status registers, a priority scheme, or some other suitable manner. Function sharing enhances device reliability in case one of the processors were to fail.

A variety of memory devices may be used with each processor. Each processor may have an associated memory such as a random access memory or other changeable memory for data storage. This memory may store data and/or instructions. This memory may be accessed solely by the processor. Alternatively, it may be accessed by two or more processors. Indirect addressing may be used to permit an external processor to directly access the memory of an internal to the device processor.

Figure 2:
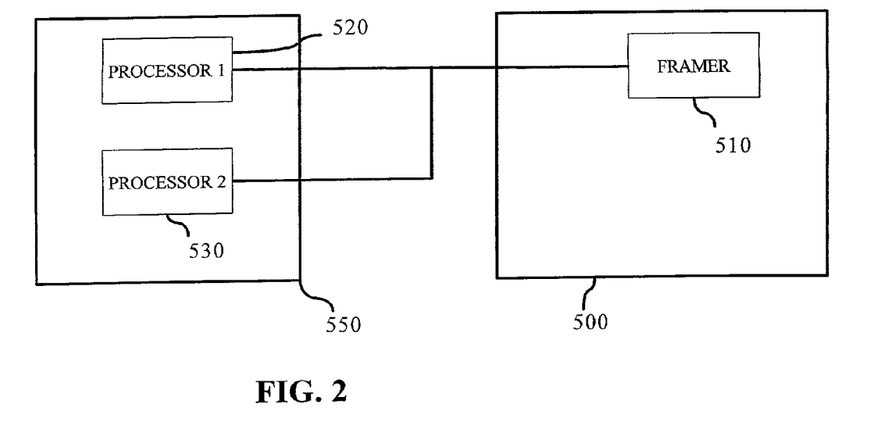
FIG. 2 illustrates an embodiment with two processors in which both processors are housed together externally to the transceiver.

In FIG. 2, two processors share a housing external to the housing of the framer. The device 500 houses the dual processor framer 510. Device 550 includes a first processor 520 and a second processor 530. Device 500 may be portable. Portability would allow the device to be taken to various locations and provide immediate and convenient communications between the user and others while the user conducts other tasks. Housing processors 520 and 530 in a stationary device permits a greater weight and volume for component parts to provide greater processing power and capabilities than would be found in a portable device. Device 550 may be a linking device or a computer. It may be stationary or it also may have mobility. Device 550 may be a server, fibre channel link, etc.

Figure 3:
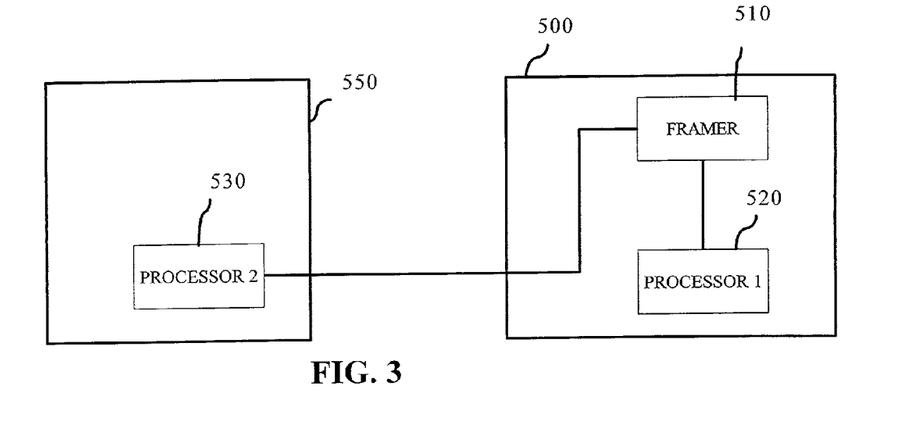
FIG. 3 illustrates an embodiment with two processors in which one processor is housed with the transceiver and one is housed externally.

In FIG. 3, device 500 houses the dual frame processor 510 and the first processor 520. Device 550 houses the second processor 530. By placing a processor in the same housing as the dual frame processor 510, higher speed operations may readily be performed as the signal paths are shortened. By placing the other processor in an external device 550, greater processing capabilities may be provided externally which do not have the speed requirements provided by an on device processor. In a specific implementation, the first processor 520 may be a processor which handles demanding low-latency protocol requirements.

The external second processor 520 may communicate with the internal first processor 520 through a set of registers, transport descriptors and data buffers that are defined in the packet/descriptor RAM 460. The external second processor 520 may write to control registers to manage operation of the internal first processor 510. Three control registers may be used: an interface control register, an indirect data register, and an indirect address register. The interface control register may designate one or more bits for status or control; for example, one non self-clearing bit may reset the framer, one non self-clearing bit may reset the internal first processor, one bit may permit the internal first processor to execute code, one bit may permit interrupt operation, one bit may set the logic level of an active interrupt, one bit may determine if there is an active interrupt, one bit may enable interrupt output, and the like. The internal first processor 510 may report its activity to the external second processor 520 through status registers. The internal first processor 510 may send interrupts to the host when time critical events need to be serviced.

In a particular embodiment, the external second processor 520 sends data payloads to the internal first processor 510 and the framer by copying the payload contents into an appropriate transmit packet buffer located in the packet descriptor memory 460. The internal first processor 510 then forms the packet header information and divides the payload into appropriate packets. When data is received, the internal first processor 510 may notify the external second processor 520 by an interrupt. In this particular embodiment, a receive interrupt may be generated to the external second microprocessor 520 from hundreds of microseconds to several milliseconds, more particularly, at once per 1.25 milliseconds. The number of bytes received per interrupt transaction may be as few as one to one thousand, more particularly, from 1 to 339 bytes. Between subsequent receive interrupts, the external second microprocessor 520 may process data from the receive buffer. If this particular embodiment is used with a protocol such as the BLUETOOTH wireless standard protocol, the internal first processor 510 may be made responsible for packet segmentation.

Figure 4:
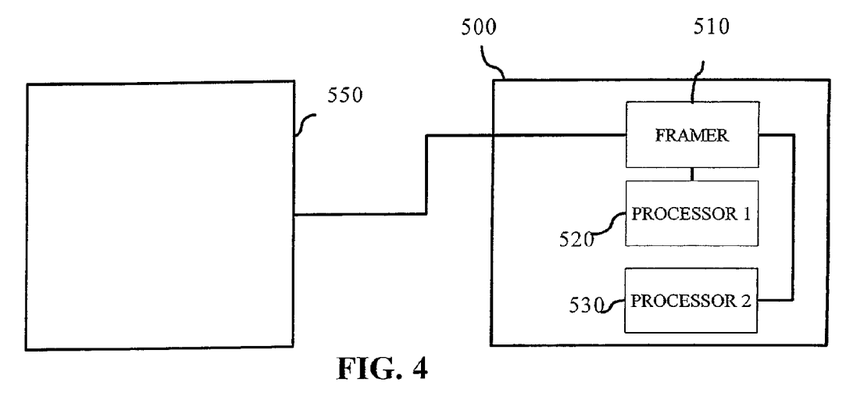
FIG. 4 illustrates an embodiment with two processors in which both processors are housed with the transceiver.

In FIG. 4, both processors 520 and 530 are housed together with the dual processor framer 510. Providing both processors in the same housing with the dual processor framer 510 provides distribution of the processing work load and higher speed operations because of the reduced signal path lengths.

Figure 5:
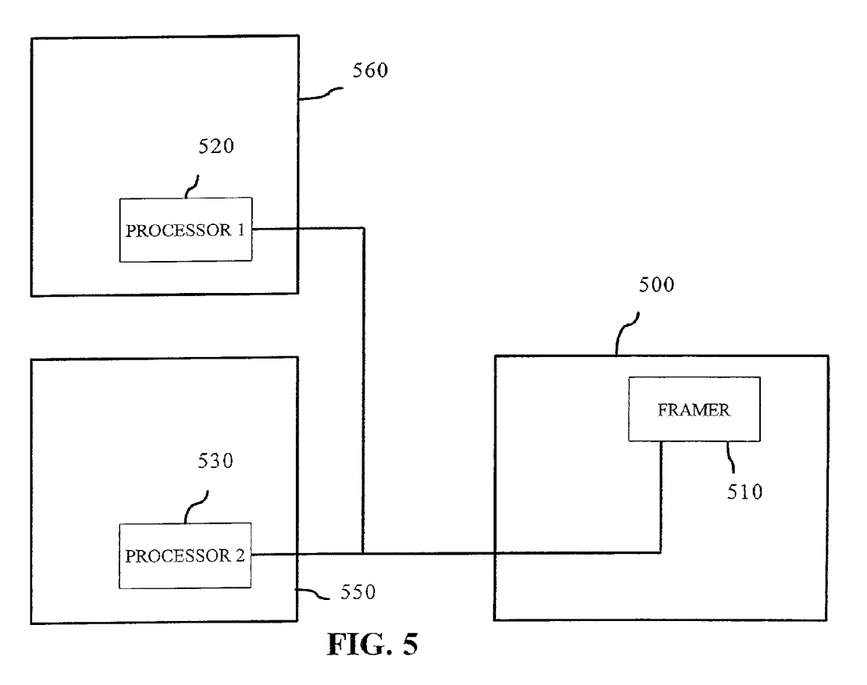
FIG. 5 illustrates an embodiment with two processors in which each processor is housed separately and externally to the transceiver.

In FIG. 5, the first and second processors 520 and 530 are in separate devices, 560 and 550, respectively. The dual processor framer 510 is in a third device. Placing the processors in separate devices allows for greater flexibility in configurations. It also provides redundancy in the event one of the devices 550 and 560 fails. In an alternative embodiment, one of the devices 560 and 550 may be communicatively coupled with the device 500 housing the dual processor framer through the other of the devices 550 and 560 such that the devices appear to be chained together.

Figure 6:
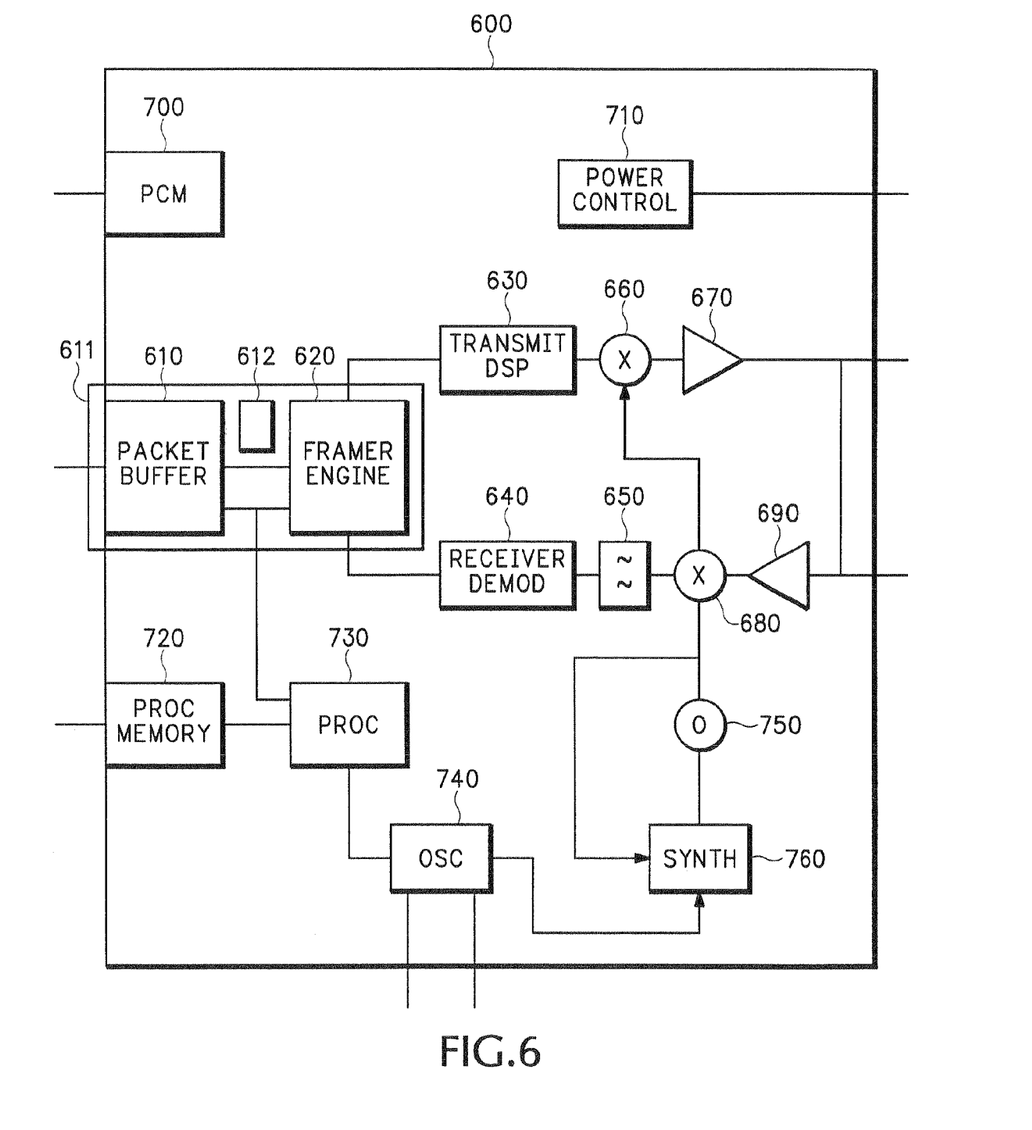
FIG. 6 illustrates an embodiment in which the framer, a processor, and other components are formed on a single integrated circuit substrate.

In FIG. 6, a specific embodiment is shown. The single integrated circuit contains the dual processor framer 611, a packet buffer 610, a framer engine 620, a processor 730 and its memory 720, a transmit digital signal processor 630, a Gaussian bandpass filter 650, a transmit multiplier 660, a transmit power amplifier 670, a low noise amplifier 690, a receive low noise multiplier 680, a voltage controlled oscillator 750, a synthesizer 760, and an oscillator circuit 740 for reception of an external clock input or for hookup to an external crystal oscillator. In the embodiment of FIG. 6, for the BLUETOOTH wireless standard version 1.1 device, the link control sequencer is a processor 612 which is housed together with the framer 611 and the link manager lies in a processor 730 external to the housing of the framer and the link control sequencer. The link manager may translate commands into operations at the baseband level. Link manager code may be resident in a host microcontroller and may write to control registers to manage the operation of the link control sequencer. The link control sequencer may report its activity to the link manager through status registers. The link control sequencer may generate interrupts to the host when time critical events need to be serviced. The link manager may translate commands into operations at the baseband level. Alternatively, the components shown in FIG. 6 may alternatively be arranged on a printed circuit board as individual components or housed in two or more integrated circuits which are mounted to a circuit board.

In FIG. 6, general purpose input/output pins may be used. These may number from one to twenty; specifically, six may be used. Each general purpose input/output may be accessed through data, configuration, and registers defined according to a protocol. They may be configured to sense buttons or drive light emitting diodes. In conjunction with some of the general purpose input/output, capture timers may be used to provide both rising and falling edge event timing capture. The time of an event marked by the capture timers may be recorded in a register. A prescaler may allow selection of the capture timer tick size. Interrupts may be individually enabled for capture timer registers.

In FIG. 6, the integrated circuit may have a number of operational parameters, including RF amplification, memory size, operating temperature, and clock rates. BLUETOOTH wireless standard class 2 and class 3 transmitter operations may be supported with an internal power amp which has a range from 0 to +4 dBm and class 1 transmitter operations are supported with an external power amp. The receive sensitivity may be as low as −82 dBm. It may be desirable to place a toggle button or self retracting slide button of the wireless device that permits a higher power signal to be sent through manual intervention by the wireless device operator. A receiving device may request either a decrease or an increase in the power of the transmitted signal. The processor memory may range from 2 K to 32 K; even more particularly, it may be an 8 K memory; even more particularly, 8188 bytes of processor memory are used. Multiple (e.g., two, four, five, eight) 8-bit input time capture registers may be used to record edge event times on the input pins. The operating temperature of the integrated circuit may range from −40 degrees to +85 degrees. The frame sync clock for frame synchronization may range from 2 KHz to 32 KHz, more particularly, it may be 8 KHz. The serial bit clock for clock synchronization for serial bit transfer may range from 128 Kbps to 32,768 Kbps; more particularly, 512 Kbps to 4096 Kbps. This specific embodiment is especially compatible with the BLUETOOTH wireless standard specification, version 1.1.

Finally, in FIG. 6, the integrated circuit may be configured using application specific integrated circuit (ASIC), field programmable gate arrays (FPGA), system on a chip (SOC), or other suitable technology. The integrated circuit may be packaged as a ball grid array with a pin ranging from 40 pins to 400 pins, more particularly, 70 to 100 pins. Yet more particularly, it may be an 81 pin package. In the 81 pin package, the balls may be arranged in a 9×9 square matrix, 10 mm×10 mm, in which each solder ball is 0.30±0.05 mm in diameter and the solder balls are spaced from one another center-to-center 0.75 mm.

The dual processor framer may conduct a fully internal loop back self test. This permits the user to test device operation independently of environment since an external testing device is not needed. The internal self test mode may switchably transfer the data from the transmit side to the receive side at one or more points in the processing for reverse processing of the data to determine if any errors or anomalies have arisen at that point. Internal self testing may be used to not only identify processing problems, but may be used in manufacture for sampling defects and performing device corrections. Various switch modes may be implemented in the dual processor framer to enable the framer to self correct by rerouting signals internally. In one self test mode, the framer may self test by sending the encoded signal directly to the receive side for decoding. In the embodiment of FIG. 6, testing completely internal to the integrated circuit may be performed in which the rf signal from the transmit power amplifier 670 may be directly routed to the low noise amplifier 690. Other variations are possible such as sending an encrypted signal from the transmit section to the receive section for decrypting or performing a side band or correlator loop back self test. Signals may also be generated which bypass certain processing. For example, a signal may be encrypted and encoded, but not whitened. This signal may be routed to the receive side for decoding and decrypting, but not dewhitening.

Figure 7:
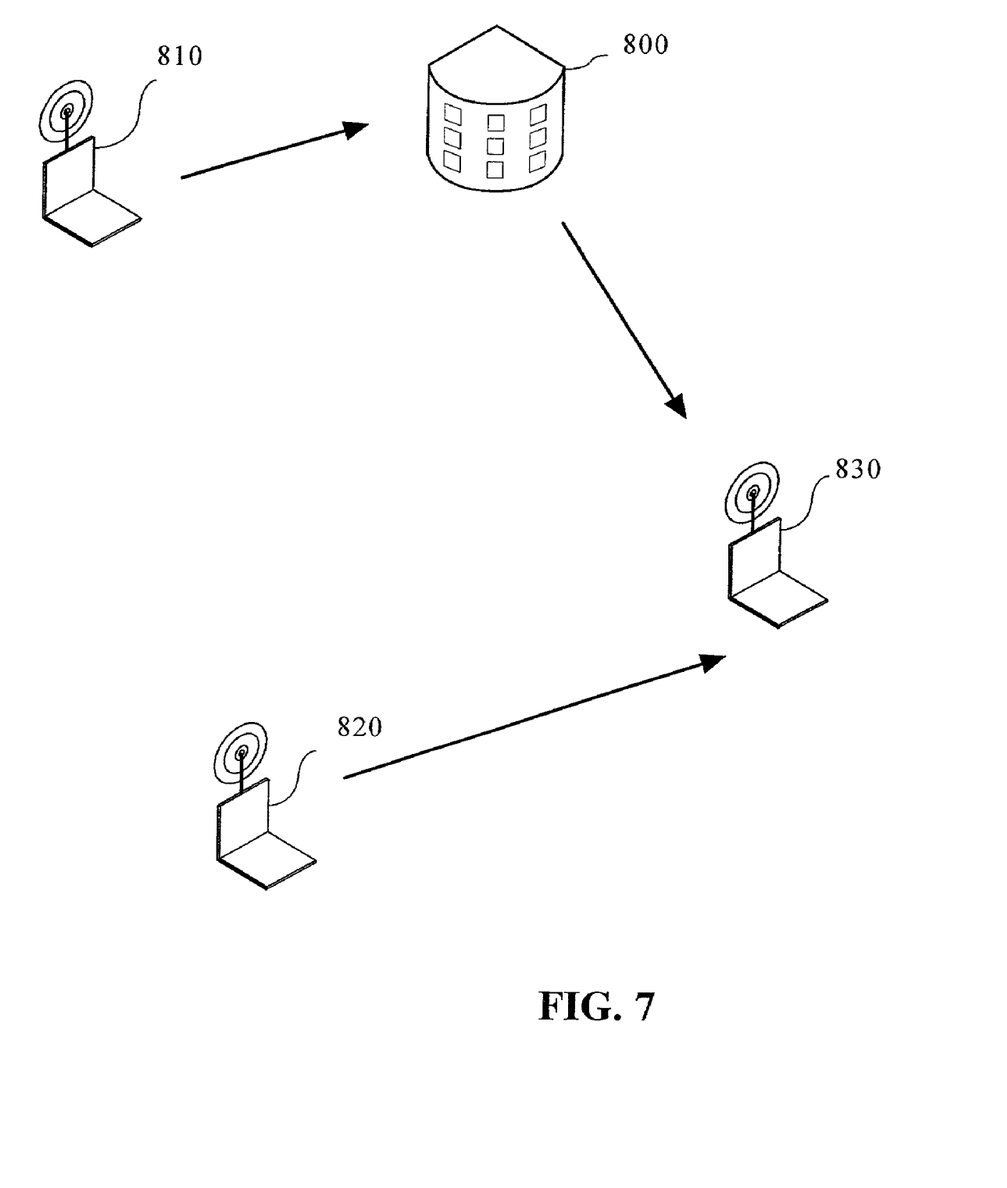
FIG. 7 illustrates a wireless local area network.

FIG. 7 illustrates an exemplary wireless local area network (WLAN) of the present invention. A host computer 800 wirelessly communicates with portable wireless devices 810, 820, and 830. The portable wireless devices 810, 820, and 830 may communicate with each other. The WLAN may be practiced with wireless standards such as the BLUETOOTH wireless standard, IEEE 802.11, or HomeRF. Each portable device 810, 820, and 830 contains a framer and may contain one or more processors. At the least, each portable device 810, 820, and 830 is communicatively coupled with two or more processors.

The dual processor framer may be used in a variety of devices. These include portable devices such as mobile phone handsets, personal data assistants, palmtops, pocket personal computers, printers, scanners, digital cameras, game consoles, MP3 players, wireless network access points, and the like.

Figure 8:
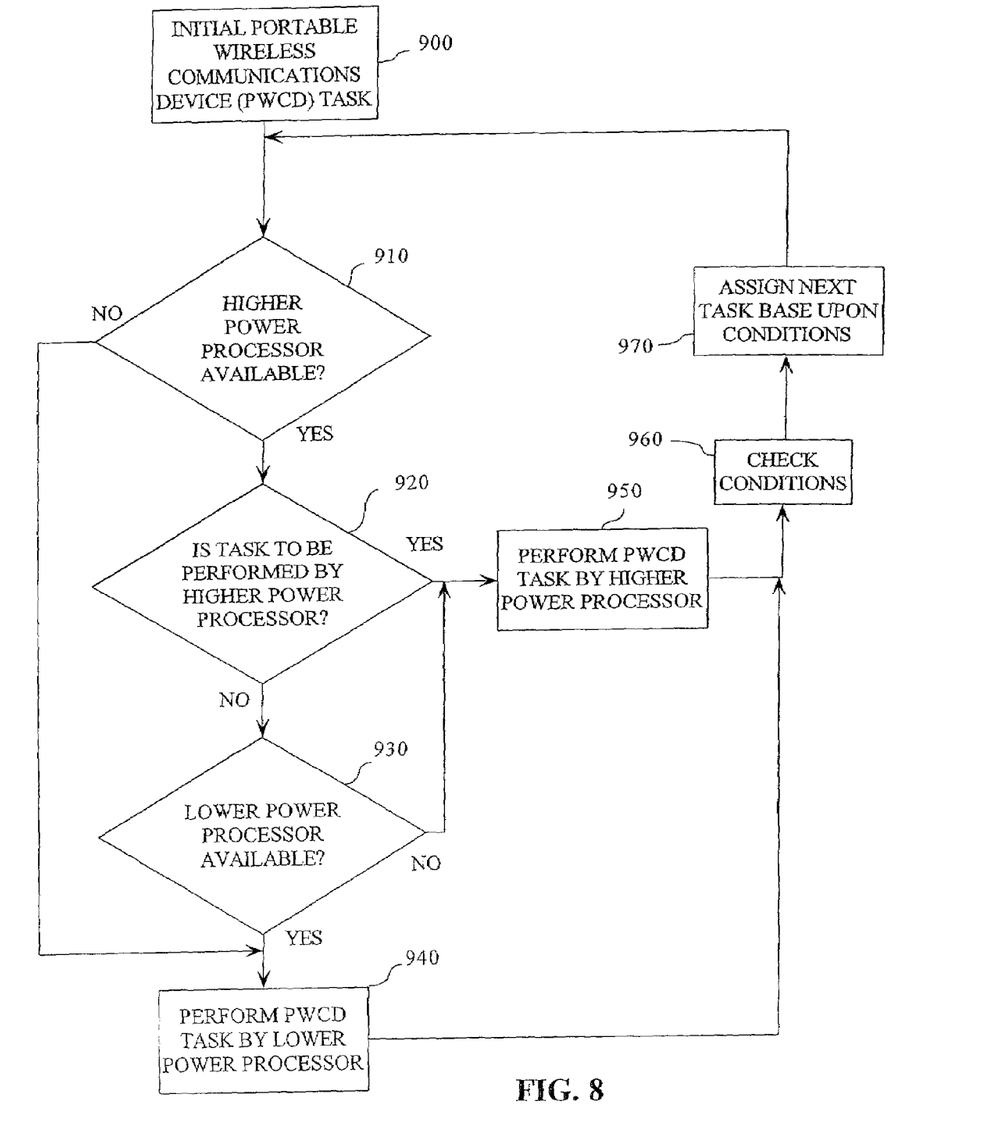
FIG. 8 illustrates a method of power conservation as practiced with the dual processor framer.

FIG. 8 illustrates one implementation of a method of the present invention in which power conservation is employed. This method is especially applicable where a higher power processor and a lower power processor both reside in a portable wireless communications device (PWCD) so as to either prolong the time before recharging rechargeable batteries or replacing batteries which are not rechargeable. An initial task is performed by the dual processors, as per step 900. This task may initializing a component or process. An inquiry is made as to whether there is a higher power processor available, as per step 910. This tests whether the higher power processor is powered up or plugged in. Handshaking may be performed to make this determination. Otherwise, steps 920 and 930 are skipped and the portable wireless communications device (PWCD) performs the task, as per step 940. If the higher power processor is available, an inquiry is made as to whether the task is to be performed by the higher power processor, as per step 920. If the task is not to be performed by the higher power processor, a determination is made as to whether the lower power processor is available, as per step 930. If the lower power processor is not available, the higher power processor performs the task anyway, as per step 950. Afterwards, PWCD conditions are checked, as per step 960, and the next task is assign accordingly, as per step 970. Otherwise, the lower power processor performs the task, as per step 940. Afterwards, PWCD conditions are checked, as per step 960, and the next task is assigned accordingly, as per step 970. Variations of this method are within the spirit and scope of this invention.

The task assignment between the higher power processor and the lower power processor may be accomplished by status flags, status registers, PWCD software code, hardwire circuitry, external host control, and the like, including combinations of some or all these techniques. Various conditions may be used to determine which processor is to handle a task and/or when to turn the higher power processor either on or off. These conditions may include low battery and/or lack of communication with another processor or other device, such as absence of an ACK signal. For example, if the higher power processor is off device and the device battery is low, then all the processing that the off device, higher power processor is able to perform may be assigned to the higher power processor. In the event battery is low and the wireless device is unable to communicate with another wireless device, the instructions and data may be transmitted from the transmitting wireless device to the host or another more proximate device which then transfers the instructions and data to the designated receiving wireless device.

Figure 9:
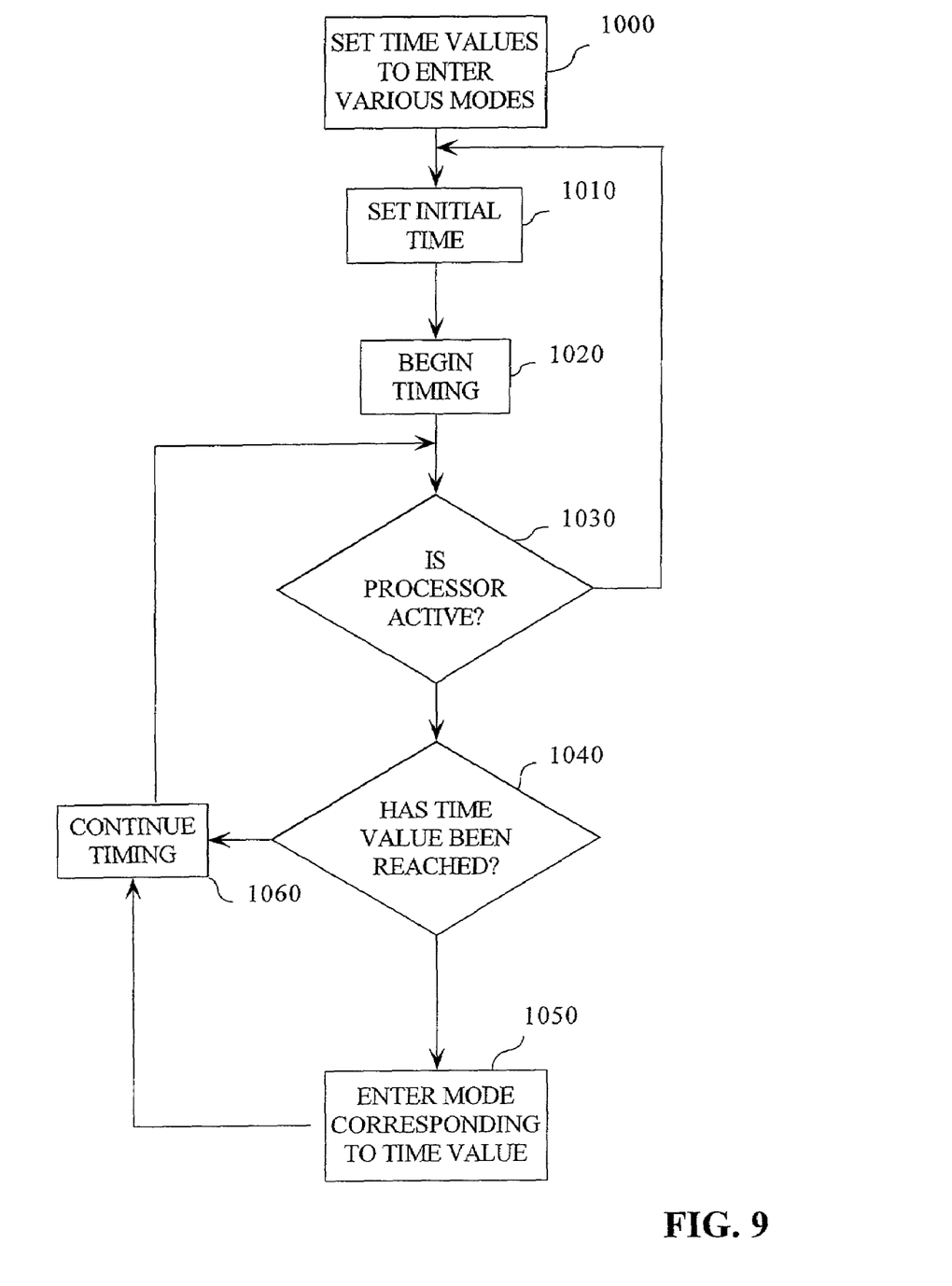
FIG. 9 illustrates a method of entering power savings modes while a processor is inactive for a predetermined length of time.

FIG. 9 illustrates an exemplary method that may be employed by a higher power processor or a processor not routinely used in the dual processor framer of the present invention. Time values are set to mark entry into various modes, such as sleep mode or a power savings mode, as per step 1000. The time values may be implemented in software code, may be looked up from memory, or may be hardwired or set within circuitry. An initial time is set, as per step 1010. Timing begins, as per step 1020. A determination is made as to whether the processor is active, as per step 1030. This determination may be performed through software or hardware and may entail the use of flags, status registers, and the like. If the processor is active, then processing returns to step 1010 where the time is reinitialized. Otherwise, a determination is made as to whether a timing value has been reached, as per step 1040. If it has not, timing is continued, as per step 1060. Otherwise, the corresponding mode is entered or is maintained, as per step 1060, and timing is continued, as per step 1060. The mode may be prioritized such that modes are successively entered as the period of activity becomes greater.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A device including a transceiver, said device comprising:
    a framer engine to encrypt and encode data to be transmitted through a wireless medium and to decode and decrypt data that is received through the wireless medium;
    a first processor for controlling operations of the framer engine;
    a power amplifier that changes between a plurality of operating power levels; and
    a second processor for sending notifications to the power amplifier to change the operating power levels;
    wherein the first processor is adapted to communicate using a first type of data words that includes fewer bits of data than a second type of data words communicated by the second processor.

2. A device including a transceiver, said device comprising:
    a framer engine to encrypt and encode data to be transmitted through a wireless medium and to decode and decrypt data that is received through the wireless medium;
    a first processor for controlling operations of the framer engine;
    a power amplifier that changes between a plurality of operating power levels; and
    a second processor for sending notifications to the power amplifier to change the operating power levels;
    wherein the first processor is adapted to communicate using a first type of data words that includes a different amount of bits of data than a second type of data words communicated by the second processor.

3. The device of claim 2 wherein the first type of data words each comprise 16 bits of data and the second type of data words each comprise 64 bits.

4. The device of claim 2 wherein the first processor is integrally formed with the device while the second processor is detachably coupled to the device.

5. The device of claim 2 wherein the second processor is adapted to issue instructions causing the transceiver to power down for sleep mode.

6. The device of claim 2 further comprising logic encoded in one or more tangible media for execution and when executed operable to test operation of the transceiver and the framer engine by transmitting encoded wireless communications from a transmit portion of the transceiver directly to a receiver portion of the transceiver for decoding, said transmission from the transmitter portion directly to the receiver portion occurring independently of any other transceivers and independently of any remote wireless devices.

7. The device of claim 2 wherein the first processor is configured to operate at a first selectable operating power mode selected from a plurality of different selectable operating power modes and the second processor constantly operates at a second fixed power mode.

8. The device of claim 2 wherein the second processor is configured to operate at a first selectable operating power mode selected from a plurality of different selectable operating power modes and the first processor constantly operates at a second fixed power mode.

9. The device of claim 2 wherein one of the processors is configured to operate at a first selectable operating power mode selected from a plurality of different selectable power operating modes and a remaining one of the processors is configured to constantly operate at a second fixed power mode.

10. The device of claim 2 wherein the first type of data words communicated by the first processor include more bits of data than the second type of data words communicated by the second processor.

11. An apparatus comprising:
    means for framing, encrypting and encoding data to be transmitted through a wireless medium and decoding and decrypting data that is received through the wireless medium;
    means for controlling the framing, encrypting and encoding and decrypting and decoding using one or more first processors;
    means for changing between a plurality of operating power levels of a power amplifier; and
    means for sending notifications to the power amplifier that control the changes between operating power levels using one or more second processors;
    wherein the first processors are adapted to communicate using a first type of data words that includes a different amount of bits of data than a second type of data words communicated by the second processors.

12. The apparatus of claim 11 wherein one of the two types of data words contains 32 bits of data and the remaining type of data words contains 8 bits of data.

13. The apparatus of claim 11 wherein one of the two types of data words contains 64 bits of data and the remaining type of data words contains 16 bits of data.

14. The apparatus of claim 11 wherein the one of the two types of data words contains four times as many bits as the remaining type of data words.

15. The apparatus of claim 11 further comprising testing the apparatus by transmitting encoded wireless communications from a transmit portion of the apparatus directly to a receiver portion of the apparatus for decoding, said transmission from the transmitter portion directly to the receiver portion occurring independently of any other transceivers and independently of any remote wireless devices.

16. The apparatus of claim 11 wherein one of the first and second processors are configured to operate at a first selectable operating power mode selected from a plurality of different selectable power operating modes and a remaining one of the first and second processors are configured to constantly operate at a second fixed power mode.

17. The apparatus of claim 11 wherein the first processors are integrally formed with the device while the second processors are detachably coupled to the device.

* * * * *